(12) United States Patent
Ding et al.

(10) Patent No.: US 10,504,523 B2
(45) Date of Patent: Dec. 10, 2019

(54) VOICE PROCESSING DEVICE, VOICE PROCESSING METHOD, AND COMPUTER PROGRAM PRODUCT

(71) Applicant: Kabushiki Kaisha Toshiba, Minato-ku, Tokyo (JP)

(72) Inventors: Ning Ding, Yokohama Kanagawa (JP); Takehiko Kagoshima, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/891,075

(22) Filed: Feb. 7, 2018

(65) Prior Publication Data

US 2018/0350370 A1    Dec. 6, 2018

(30) Foreign Application Priority Data

Jun. 1, 2017  (JP) ................ 2017-108959

(51) Int. Cl.
*G10L 17/00*       (2013.01)
*G10L 25/78*       (2013.01)
(Continued)

(52) U.S. Cl.
CPC ............ *G10L 17/005* (2013.01); *G10L 15/22* (2013.01); *G10L 25/78* (2013.01);
(Continued)

(58) Field of Classification Search
CPC ....... G10L 15/22; G10L 17/005; G10L 25/78; G10L 21/0272; G10L 15/26; G10L 17/00; H04M 3/568; H04L 12/1831
(Continued)

(56) References Cited

U.S. PATENT DOCUMENTS 9,349,375 B2    5/2016  Taniguchi et al.
9,552,840 B2    1/2017  Kim et al.
(Continued)

FOREIGN PATENT DOCUMENTS

JP    2004-309965       11/2004
JP    2005184386 A  *   7/2005  ............. G10L 15/28
(Continued)

OTHER PUBLICATIONS

Parra L. et al, "Convolutive Blind Separation of Non-Stationary Sources", IEEE Transactions on Speech and Audio Processing, vol. 8, No. 3, 2000, pp. 320-327.
(Continued)

*Primary Examiner* — Yogeshkumar Patel
(74) *Attorney, Agent, or Firm* — Knobbe, Martens, Olson & Bear, LLP (57) ABSTRACT

According to an embodiment, a voice processing device includes a receiver, a separator, and an output controller. The receiver is configured to receive n input signals input into n voice input devices respectively corresponding to n sound sources, where n is an integer of 2 or more. The separator is configured to separate the input signals by the sound sources to produce n separation signals. The output controller is configured to, according to the number of sound sources having uttered voice sounds, switch between an output signal produced based on the input signal and an output signal produced based on the separation signal, and output the output signal.

10 Claims, 7 Drawing Sheets

(51) Int. Cl.
*G10L 15/22* (2006.01)
*H04L 12/18* (2006.01)
*H04M 3/56* (2006.01)
*G10L 15/26* (2006.01)
*G10L 21/0272* (2013.01)

(52) U.S. Cl.
CPC ........ *H04L 12/1831* (2013.01); *H04M 3/568* (2013.01); *G10L 15/26* (2013.01); *G10L 17/00* (2013.01); *G10L 21/0272* (2013.01)

(58) Field of Classification Search
USPC ........................................ 704/246, 275, 233
See application file for complete search history.

(56) References Cited

U.S. PATENT DOCUMENTS

2013/0339025 A1* 12/2013 Suhami .................. H04R 25/00
704/271
2017/0061981 A1* 3/2017 Nakadai ................ G10L 21/028

FOREIGN PATENT DOCUMENTS

| | | |
|---|---|---|
| JP | 2008-309856 | 12/2008 |
| JP | 2014-501064 | 1/2014 |
| JP | 2014-041308 | 3/2014 |
| JP | 2017-044916 | 3/2017 |

OTHER PUBLICATIONS

Warsitz E. et al, "Blind Acoustic Beamforming Based on Generalized Eigenvalue Decomposition", IEEE Transactions on Audio, Speech, and Language Processing, vol. 15, No. 5, 2007, pp. 1529-1539.

Yilmaz O. et al, "Blind Separation of Speech Mixtures via Time-Frequency Masking", IEEE Transactions on Signal Processing, vol. 52, No. 7, 2004, pp. 1830-1847.

* cited by examiner

VOICE PROCESSING DEVICE, VOICE PROCESSING METHOD, AND COMPUTER PROGRAM PRODUCT

CROSS-REFERENCE TO RELATED APPLICATIONS

This application is based upon and claims the benefit of priority from Japanese Patent Application No. 2017-108959, filed on Jun. 1, 2017; the entire contents of which are incorporated herein by reference.

FIELD

Embodiments described herein relate generally to a voice processing device, a voice processing method, and a computer program product.

BACKGROUND

There is known a conferencing system for recognizing speeches made in a conference, in which a plurality of speakers participate, and writing up the minutes. In such a conferencing system, for example, a microphone is assigned to each of the speakers, and the system recognizes voices input from the microphones.

DETAILED DESCRIPTION

According to an embodiment, a voice processing device includes a receiver, a separator, and an output controller. The receiver is configured to receive n input signals input into n voice input devices respectively corresponding to n sound sources, where n is an integer of 2 or more. The separator is configured to separate the input signals by the sound sources to produce n separation signals. The output controller is configured to, according to the number of sound sources having uttered voice sounds, switch between an output signal produced based on the input signal and an output signal produced based on the separation signal, and output the output signal.

Hereinafter, preferred embodiments of a voice processing device are described with reference to the accompanying drawings.

First Embodiment

A voice processing device according to a first embodiment is configured to, according to the number of sound sources having uttered voice sounds (the number of sound sources), switch between an output signal produced based on an input signal and an output signal produced based on a separation signal and output the output signal. The input signal is a voice signal acquired by a voice input device such as a microphone. The separation signal is a signal obtained by separating input signals by sound sources.

For example, when the number of sound sources is two or more, separation signals are output as output signals. This can suppress a wraparound speech. In contrast, when the number of sound sources is one, an input signal from a microphone corresponding to the sound source is output as an output signal. This can avoid the occurrence of signal distortion resulting from sound source separation. The suppression of a wraparound speech and the avoidance of signal distortion enable an increase in the accuracy of subsequent processing such as voice recognition.

Figure 1:
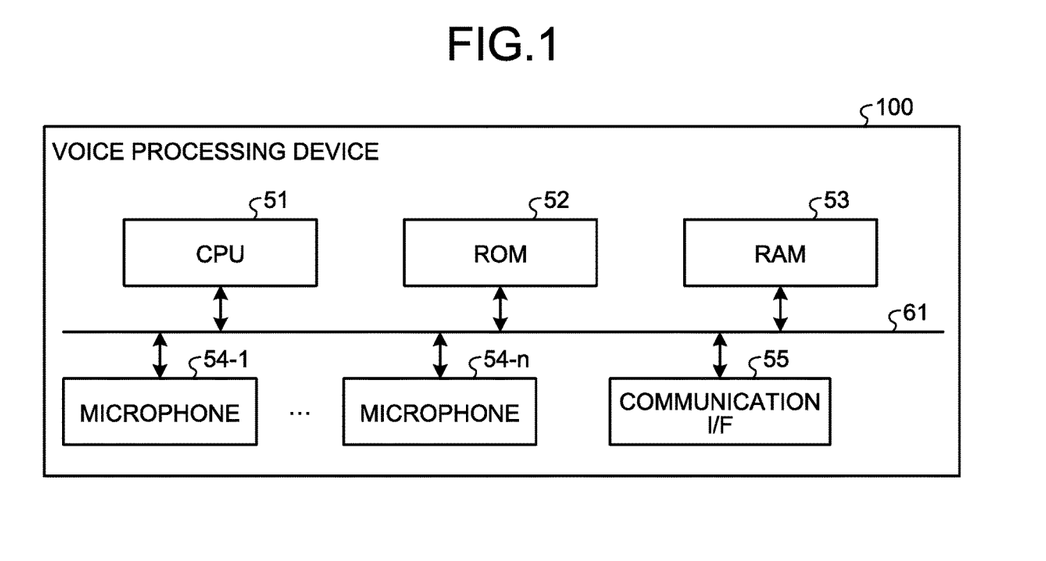
FIG. 1 is a diagram illustrating a hardware configuration of a voice processing device according to a first embodiment.

FIG. 1 is an explanatory diagram illustrating an example of a hardware configuration of a voice processing device 100 according to the first embodiment. The same hardware configuration as that according to the first embodiment may be applied to second and subsequent embodiments.

The voice processing device 100 includes a controller such as a central processing unit (CPU) 51, storage units such as a read only memory (ROM) 52 and a random access memory (RAM) 53, microphones 54-1 to 54-n, a communication I/F 55 configured to perform communications by connecting to a network, a bus 61 configured to connect the above-mentioned units.

Each of the microphones 54-1 to 54-n is an example of a voice input device to which a sound is input from a sound source. For example, n microphones 54-1 to 54-n (n is an integer of 2 or more) are provided respectively corresponding to n sound sources. In the case where the microphones 54-1 to 54-n do not have to be distinguished from each other, the microphones 54-1 to 54-n are sometimes simply referred to as the microphone 54.

For example, in a case where the voice processing device 100 is applied to a conferencing system, one microphone 54 is assigned to each of conference participants (speakers). In the case of holding a teleconference, a participant may be present at a remote location. In this case, a voice output device such as an audio speaker configured to output speeches made by the participant present at the remote location corresponds to one sound source. The microphone 54 outputs an input signal corresponding to an input sound.

Figure 2:
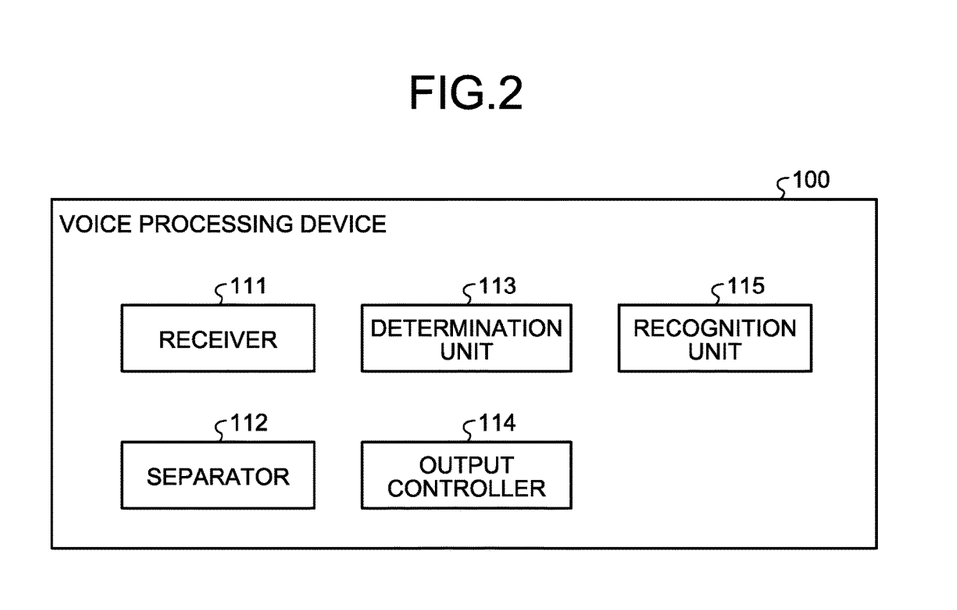
FIG. 2 is a functional block diagram illustrating the voice processing device according to the first embodiment.

FIG. 2 is a block diagram illustrating an example of a functional configuration of the voice processing device 100 according to the first embodiment. As illustrated in FIG. 2, the voice processing device 100 includes a receiver 111, a separator 112, a determination unit 113, an output controller 114, and a recognition unit 115.

The above-mentioned units illustrated in FIG. 2 may be implemented, for example, by one or a plurality of processors. For example, the units may be implemented by executing a computer program using a processor such as the CPU 51, that is, may be implemented by software. Alternatively, the units may be implemented by a processor such as a special-purpose integrated circuit (IC), that is, hardware. Alternatively, the units may be implemented using software and hardware in combination. In the case of using a plurality of processors, each of the processors may implement one of the units, or may implement two or more of the units.

Each of the units may store data used for processing in a storage unit or may read and use the data from the storage unit, as necessary. Besides the above-mentioned ROM 52 and RAM 53, any storage media, such as a hard disk drive (HDD), an optical disc, and a memory card, may be used as the storage units. The storage units may be storage media physically different from each other, or may be different storage areas that belong to physically the same storage medium. Alternatively, each of the storage units may be implemented by a plurality of physically different storage media.

The receiver 111 receives n input signals respectively input to the n microphones 54-1 to 54-n.

The separator 112 executes sound source separation to separate input signals by sound source to produce a plurality of separation signals. The separator 112 receives n input signals respectively corresponding to the n sound sources to produce n separation signals respectively corresponding to the n sound sources. The separator 112 separates, for example, a plurality of input signals by sound sources sequentially, by a microphone array separation method. The separation method may be based on the independent component analysis (ICA), or may alternatively be based on time-frequency masking.

A real-time sound source separation method based on a method described in Japanese Patent Application Laid-open No. 2014-041308 may be applied. In this method, an auxiliary variable is estimated using input signals. Then, based on the estimated auxiliary variable and a separation matrix, the separation matrix is updated so that a function value of an approximate auxiliary function becomes the minimum. Using the latest updated separation matrix, the input signals are separated.

The determination unit 113 determines the number of sound sources that have simultaneously uttered voice sounds during a predetermined period. The predetermined period corresponds to, for example, a period for acquiring a signal serving as a unit of voice recognition. For example, the determination unit 113 calculates a likelihood that a separation signal is a voice signal (the likelihood of voice). The determination unit 113 determines the number of separation signals having a likelihood equal to or more than a threshold as the number of sound sources having uttered voice sounds. The likelihood of the signal being a voice may be determined by any index using a signal-to-noise ratio (SNR), spectrum entropy, or crossing entropy, for example.

The determination unit 113 may determine the number of sound sources by using the powers of separation signals. For example, the determination unit 113 calculates the power of each separation signal. The determination unit 113 determines the number of separation signals having a power equal to or more than a threshold as the number of sound sources having uttered voice sounds.

The threshold to be compared with the power may be a predetermined threshold or may be a value calculated from the powers of calculated separation signals. For example, the determination unit 113 may calculate the average of the powers of separation signals (the average power), and the calculated average may be taken as a threshold. The determination unit 113 determines the number of separation signals having a power equal to or more than the average power as the number of sound sources having uttered voice sounds.

The output controller 114 controls the output of an output signal for the recognition unit 115. For example, according to the number of sound sources having uttered voice sounds, the output controller 114 switches between an output signal produced based on an input signal and an output signal produced based on a separation signal and outputs the output signal.

More specifically, when the number of sound sources that have uttered voice sounds is one, the output controller 114 outputs an output signal produced based on an input signal. For example, in n input signals, the output controller 114 selects one input signal that is more effective to voice recognition, and outputs the selected input signal as an output signal. More specifically, the output controller 114 calculates the powers or SNRs of a plurality of input signals, and determines an input signal having the highest power or SNR as an input signal that have been acquired by a microphone 54 positioned closest to a speaker serving as a sound source, and selects the input signal.

In the case where the correspondence between sound sources and input signals is known, the output controller 114 may select, in n input signals, an input signal corresponding to a sound source that is determined to have uttered a voice sound, and output the selected input signal as an output signal.

For a sound source that is determined to have uttered no voice sound, the output controller 114 does not have to output an output signal (mute the signal). The method of selecting one signal from input signals does not require processing for emphasizing a signal as is the case in a later-mentioned second embodiment, and this can reduce the amount of calculation.

When the number of sound source having uttered voice sounds is two or more, the output controller 114 outputs output signals produced based on the respective separation signals. The output controller 114, for example, outputs n separation signals as n output signals that correspond to the respective n sound sources.

When there is no sound source that have uttered a voice sound (the number of sound sources=0), the output controller 114 does not output an output signal, for example.

The recognition unit 115 performs voice recognition for an output signal. For example, for each sound source (speaker), the recognition unit 115 performs voice recognition for an output signal corresponding to the sound source. In addition to the voice recognition or instead of the voice recognition, voice processing other than the voice recognition may be performed.

In the case where the voice processing device 100 is applied to a conferencing system, the voice processing device 100 may further include a function unit configured to control a conference. The voice processing device 100 may include, for example, a function of displaying the results of voice recognition, a function of writing up minutes by using the results of voice recognition, and a function of outputting a voice based on an input signal or an output signal.

Figure 3:
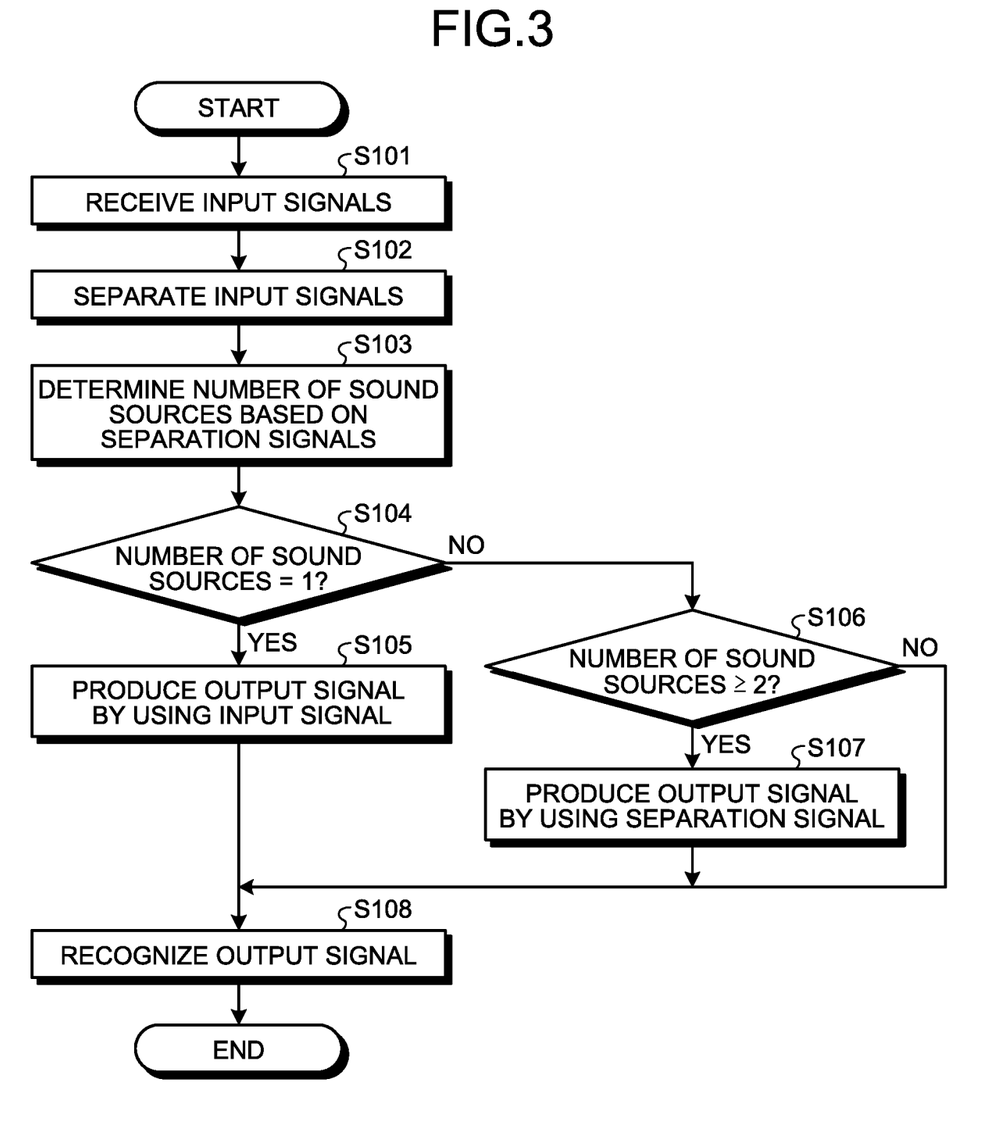
FIG. 3 is a flowchart illustrating voice processing in the first embodiment.

Next, voice processing performed by the thus-configured voice processing device 100 according to the first embodiment is described using FIG. 3. FIG. 3 is a flowchart illustrating an example of voice processing in the first embodiment.

The receiver 111 receives the input of input signals acquired by the respective microphones 54 (Step S101). The separator 112 performs sound source separation for the input signals, and outputs separation signals for the respective sound sources (Step S102). Based on the separation signals, the determination unit 113 determines the number of sound sources having uttered voice sounds (the number of sound sources) (Step S103).

The output controller 114 determines whether the number of sound sources is one (Step S104). If the number of sound sources is one (Yes at Step S104), then the output controller 114 produces an output signal by using an input signal (Step S105). For example, the output controller 114 selects one from n input signals, and outputs the selected input signal as an output signal.

If the number of sound sources is not one (No at Step S104), then the output controller 114 determines whether the number of sound sources is two or more (Step S106). If the number of sound sources is two or more (Yes at Step S106), then the output controller 114 produces output signals by using separation signals (Step S107). For example, the output controller 114 uses n separation signals as n output signals corresponding to the respective n sound sources.

If the number of sound sources is not two or more (No at Step S106), and after the output signal(s) is produced at Step S105 or Step S107, the recognition unit 115 performs voice recognition for the output signals (Step S108). The case where the number of sound sources is not two or more means, for example, is the case where there is no sound source having uttered a voice sound. As described above, under such situation, sometimes an output signal is not output. If an output signal is not output, the recognition unit 115 does not have to perform voice recognition.

Figure 4:
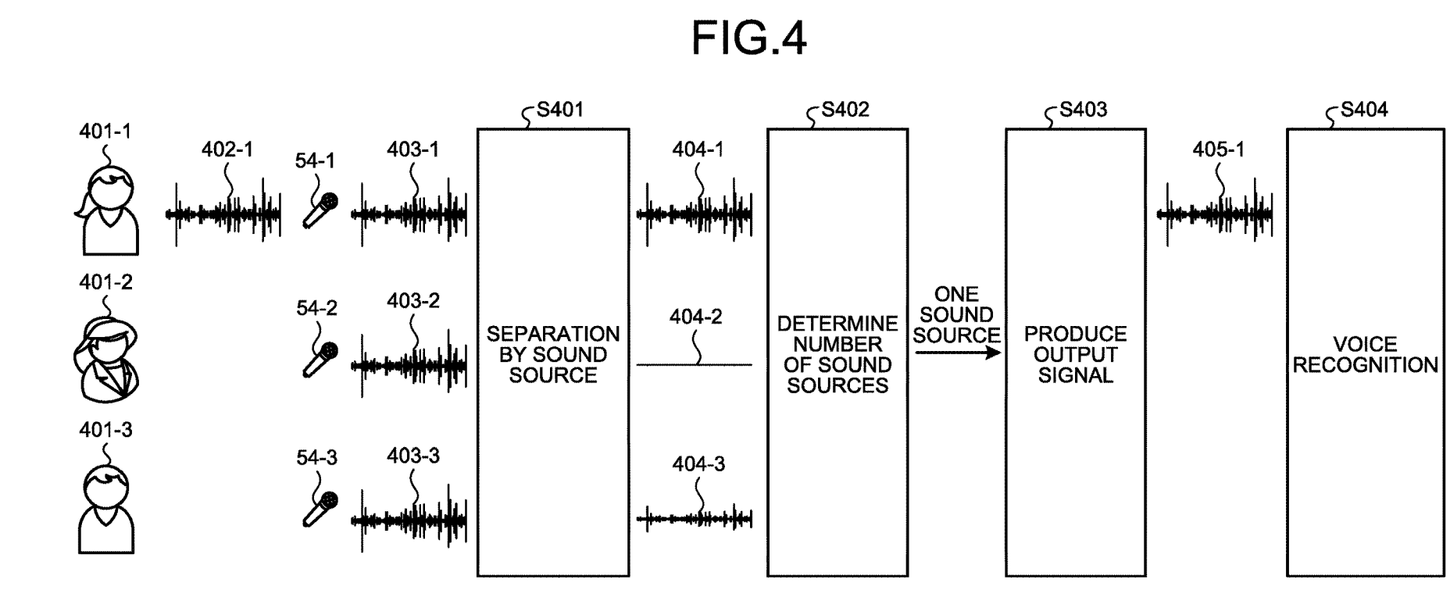
FIG. 4 is a diagram illustrating an example of processing performed when the number of sound sources is determined to be one.
Figure 5:
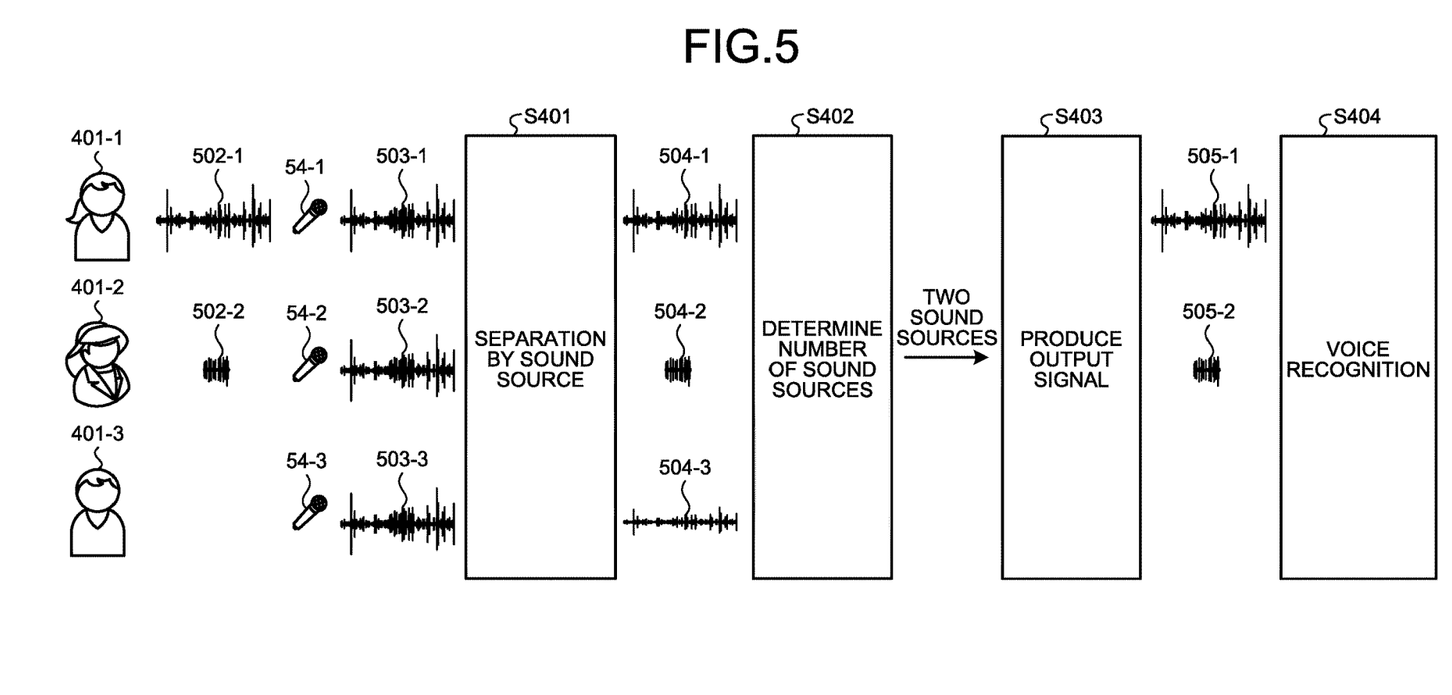
FIG. 5 is a diagram illustrating an example of processing performed when the number of sound sources is determined to be two.

Next, specific examples of voice processing performed by the voice processing device 100 are described using FIG. 4 and FIG. 5. FIG. 4 is a diagram illustrating an example of processing performed when the number of sound sources is determined to be one. FIG. 5 is a diagram illustrating an example of processing performed when the number of sound sources is determined to be two.

FIG. 4 and FIG. 5 each illustrate an example in which the number of speakers each serving as a sound source is three (speakers 401-1, 401-2, and 401-3). Three microphones 54-1, 54-2, and 54-3 are provided to the respective speakers.

The number of input signals is the same as the number of the microphones 54. For example, as illustrated in FIG. 4, when only the speaker 401-1 makes a speech, input signals 403-1, 403-2, and 403-3 are output from the microphones 54-1, 54-2, and 54-3, respectively, in response to the speech 402-1 made by the speaker 401-1.

The separator 112 performs sound source separation for the three input signals, and outputs three separation signals 404-1, 404-2, and 404-3 that correspond to the respective sound sources (the respective microphones 54) (Step S401).

In the sound source separation, back-projection processing is required to determine the amplitudes of separation signals. The back projection is processing for projecting a separation signal back onto a selected input signal and determining the amplitude of the separation signal.

When the distance between a plurality of the microphones 54 is short, the amplitudes of the input signals of the microphones 54 differ little from each other. Therefore, it is only required that back-projection is performed using the input signal of any of the microphones 54. In contrast, when the distance between a plurality of the microphones 54 is long, the amplitudes of the input signals of the microphones 54 greatly differ from each other. Therefore, when back-projection is performed using the input signal of any of the microphones 54, a separation signal is sometimes adversely affected.

In the example illustrated in FIG. 4, if the distance between a plurality of the microphones 54 is long, then the amplitude of the input signal 403-1 containing the speech 402-1 of the speaker 401-1 acquired using the microphone 54-1 is greater than the amplitude of the input signal 403-3 containing the speech 402-1 of the speaker 401-1 acquired using the microphone 54-3. When back-projection of the separation signal 404-1 for the speaker 401-1 is performed using the input signal 403-3, the separation signal 404-1 for the speaker 401-1 is smaller.

In the present embodiment, back-projection is performed based on the input signal of a microphone closest to each of the speakers. In the example of FIG. 4, using the input signal 403-1, back-projection of the separation signal 404-1 for the speaker 401-1 is performed. Using the input signal 403-2, back-projection of the separation signal 404-2 for the speaker 401-2 is performed. Using the input signal 403-3, back-projection of the separation signal 404-3 for the speaker 401-3 is performed.

It is ideal if sound source separation can completely suppress a wraparound speech, but a wraparound speech may not be completely suppressed and remain. In the example illustrated in FIG. 4, for the speech made by the speaker 401-1, in separation signal 404-2, wraparound speech voice is satisfactorily suppressed, while in separation signal 404-3, a wraparound speech is not completely suppressed and remains.

The determination unit 113 determines the number of sound sources having uttered voice sounds, based on separation signals (Step S402). For example, as illustrated in FIG. 4, the determination unit 113 calculates the likelihood of voice for each of the separation signal 404-1, the separation signal 404-2, and the separation signal 404-3.

For example, the separation signal 404-1 is a signal obtained by separating the speech 402-1 made by the speaker 401-1, and accordingly, has a higher likelihood of voice. In the separation signal 404-2, a wraparound speech is suppressed, and accordingly, the separation signal 404-2 has a greatly lower likelihood of voice. In the separation signal 404-3, a wraparound speech is not completely suppressed and remains, but, the separation signal 404-3 has a lower likelihood of voice. For example, if the separation signals 404-1, 404-2, and 404-3 have likelihoods of voice of 0.9, 0, and 0.2, respectively, and a predetermined threshold of the likelihood of voice is 0.5, then the determination unit 113 determines that the number of sound sources having uttered voice sounds is one because the number of separation signals having a likelihood of voice equal to or more than the threshold is one.

In the case where the number of sound sources is determined using the powers of separation signals, the determination is made as follows. For example, if the powers of the separation signals 404-1, 404-2, and 404-3 are 0.9, 0 and 0.2, respectively, then the determination unit 113 determines that the number of sound sources having uttered voice sounds is one because the number of separation signals having a power equal to or more than the threshold is one.

In the case where the number of sound sources is determined using an average power, the determination is made as follows. For example, if the power of the separation signals 404-1, 404-2, and 404-3 are 0.9, 0 and 0.2, respectively, then, the determination unit 113 uses these figures to calculate the average power to be 0.37. The determination unit 113 determines that the number of sound sources having uttered voice sounds is one because the number of separation signals having a power equal to or more than the average power is one.

The output controller 114 produces an output signal according to a determination result (Step S403). In the example illustrated in FIG. 4, the number of sound sources is determined to be one, and accordingly, the output controller 114 uses the input signal 403-1 corresponding to the sound source (speaker 401-1) to produce an output signal 405-1. Since the speaker 401-2 and the speaker 401-3 make no speech, the output controller 114 makes output signals for these speakers mute.

The recognition unit 115 performs voice recognition for an output signal (Step S404).

FIG. 5 is a diagram illustrating an example of processing performed when the speaker 401-1 and the speaker 401-2 simultaneously make speeches. In this case, in response to the speech 502-1 made by the speaker 401-1 and the speech 502-2 made by the speaker 401-2, input signals 503-1, 503-2, and 503-3 are output from the microphones 54-1, 54-2, and 54-3, respectively.

Furthermore, the separation signals 504-1, 504-2, and 504-3 are obtained through sound source separation (Step S401). The separation signal 504-1 is a signal obtained by separating the speech 502-1 made by the speaker 401-1. The separation signal 504-2 is a signal obtained by separating the speech 502-2 made by the speaker 401-2. The separation signal 504-3 is a signal of a wraparound speech that cannot be suppressed.

The determination unit 113 determines the number of sound sources having uttered voice sounds, based on the separation signals. For example, if the separation signals 504-1, 504-2, and 504-3 have likelihoods of voice of 0.9, 0.7, and 0.2, respectively, and a predetermined threshold of the likelihood of voice is 0.5, the determination unit 113 determines that the number of sound sources having uttered voice sounds is two because the number of separation signals having a likelihood of voice equal to or more than the threshold is two (Step S402).

The number of sound sources is determined to be two, and accordingly, the output controller 114 produces output signals, based on the respective separation signals (Step S403). For example, the output controller 114 uses the separation signal 504-1 to produce an output signal 505-1 for the speaker 401-1. The output controller 114 uses the separation signal 504-2 to produce an output signal 505-2 for the speaker 401-2. Since the speaker 401-3 makes no speech, the output controller 114 makes an output signal for the speaker 401-3 mute (no-utterance or silent).

The recognition unit 115 performs voice recognition for the output signals (Step S404).

Even in the case where the microphones 54 are in a one-to-one correspondence with speakers as is the case with the present embodiment, when the speakers simultaneously make speeches, there is a possibility that a wraparound speech might occur. In the case where the number of speakers having made speeches is one (in the case where the number of sound sources is one), it can be determined that there is no wraparound speech, and hence, even when voice recognition is performed using an input signal, there is a small possibility that recognition accuracy might be decreased. Meanwhile, in the case where the number of sound sources having uttered voice sounds is one, a separation signal may be output as an output signal. However, when an input signal is output as an output signal as is the case with the present embodiment, the occurrence of signal distortion accompanying sound source separation can be avoided.

As described above, the voice processing device according to the first embodiment acquires input signals by using a plurality of microphones for a plurality of respective speakers (sound sources). The device separates the acquired input signals by sound source, and determines the number of sound sources having simultaneously uttered voice sounds. Then, according to the number of sound sources, the device switches between the input signal and a separation signal and outputs the signal as an output signal, and performs voice recognition. This suppresses a wraparound speech, and allows a voice of each speaker to be recognized with higher accuracy.

Second Embodiment

A voice processing device according to a second embodiment, when the number of sound sources having uttered voice sounds is one, produces and outputs an output signal emphasizing the voice from the direction of the sound source. This enables a further increase in the accuracy of subsequent processing such as voice recognition.

Figure 6:
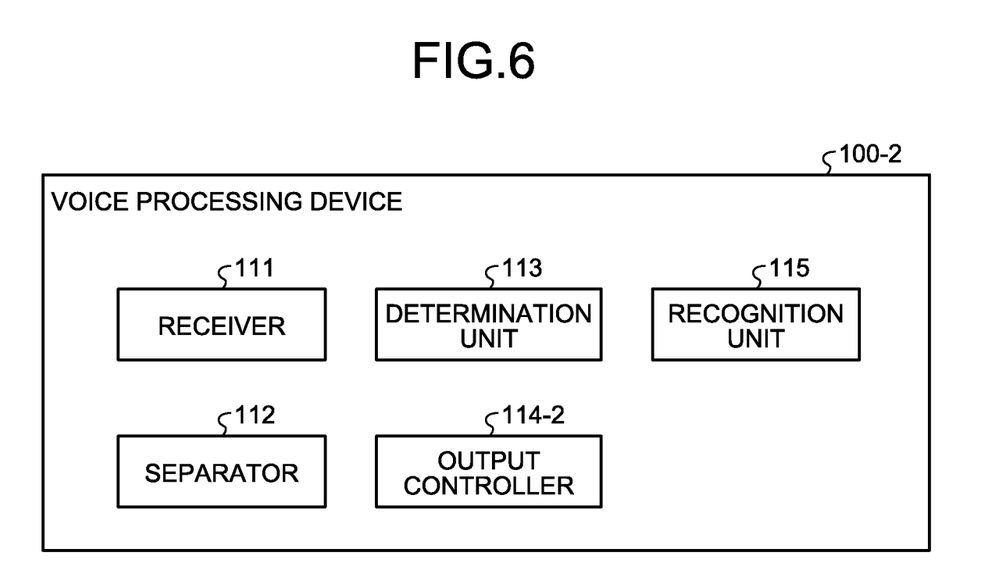
FIG. 6 is a functional block diagram illustrating a voice processing device according to a second embodiment.

FIG. 6 is a block diagram illustrating a configuration example of a voice processing device 100-2 according to the second embodiment. As illustrated in FIG. 6, the voice processing device 100-2 includes the receiver 111, the separator 112, the determination unit 113, an output controller 114-2, and the recognition unit 115.

The second embodiment differs from the first embodiment in the function of the output controller 114-2. Other configurations and functions are the same as those illustrated in FIG. 1, that is, the block diagram illustrating the voice processing device 100 according to the first embodiment, and therefore the same reference numerals are assigned, and descriptions thereof are omitted.

The output controller 114-2 differs from the output controller 114 according to the first embodiment in that, when the number of sound sources having uttered voice sounds is one, the output controller 114-2 produces an output signal emphasizing the voice from the direction of the sound source by using an input signal. The output controller 114-2 produces a signal emphasizing the voice from the direction of the sound source, for example, by beam-forming using a plurality of input signals. The beam-forming is a signal processing technique to control directivity and is a method of, for example, calculating and correcting a difference in the time of arrival of voices between the microphones. Since the voice from the direction of the sound source is emphasized, subsequent processing such as voice recognition can be performed with even higher accuracy. A method other than beam-forming may be employed as long as the method enables a voice from the direction of a sound source to be emphasized using an input signal.

The overall flow of voice processing by the voice processing device 100-2 according to the second embodiment is the same as that illustrated in FIG. 3. In the second embodiment, at Step S105, the output controller 114-2 performs beam-forming using a plurality of input signals, and produces an output signal emphasizing a voice from the direction of a sound source.

Figure 7:
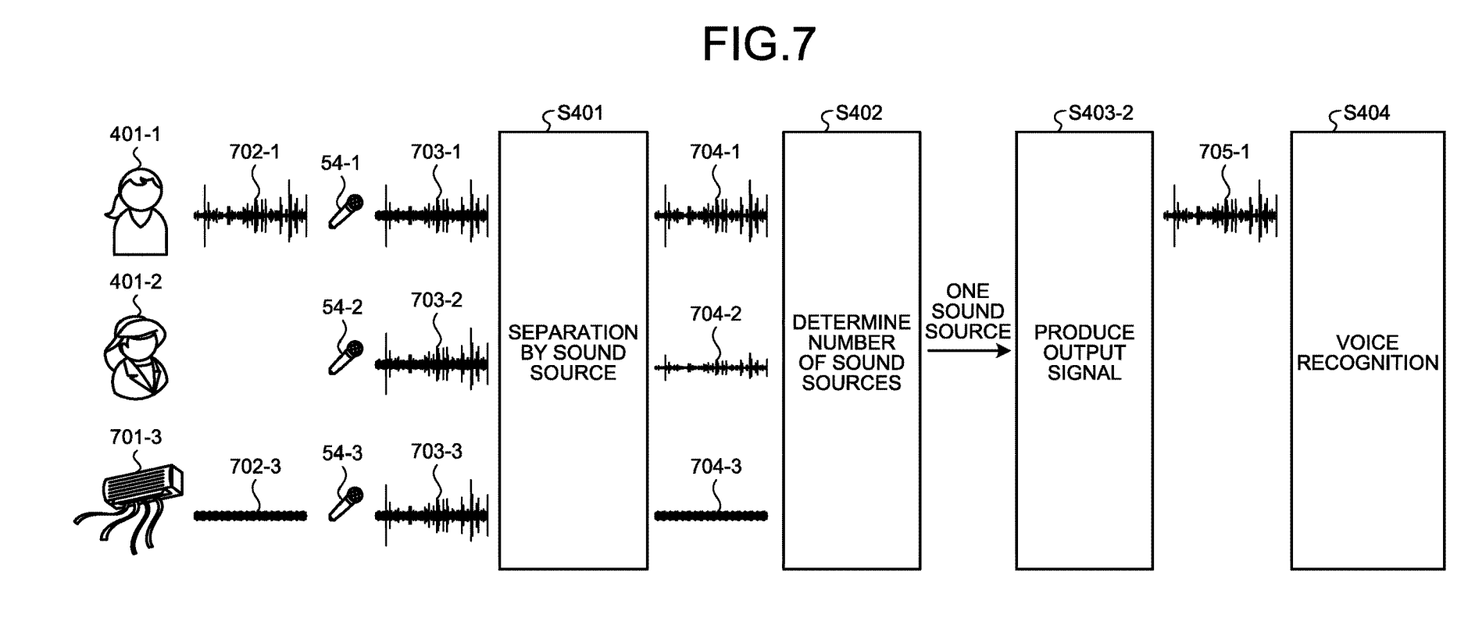
FIG. 7 is a diagram illustrating an example of processing performed when the number of sound sources is determined to be one.

Next, a specific example of voice processing by the voice processing device 100-2 according to the second embodiment is described using FIG. 7. FIG. 7 is a diagram illustrating an example of processing performed when the number of sound sources is determined to be one. Furthermore, FIG. 7 illustrates an example in which, instead of the speech made by speaker 401-3, a noise 702-3 from an air-conditioner 701-3 serving as a noise source example is input.

As illustrated in FIG. 7, when only the speaker 401-1 makes a speech and there is the noise 702-3 from the air-conditioner 701-3, in response to the speech 702-1 made by the speaker 401-1 and the noise 702-3, input signals 703-1, 703-2, and 703-3 are output from the microphones 54-1, 54-2, and 54-3, respectively.

The separator 112 performs sound source separation for the three input signals, and outputs three separation signals 704-1, 704-2, and 704-3 that correspond to the respective sound sources (the respective microphones 54) (Step S401). The separation signal 704-1 is a separation signal from the speech 702-1 made by the speaker 401-1. The separation signal 704-2 is a signal of a wraparound speech that cannot be suppressed. The separation signal 704-3 is a separation signal from the noise 702-3 made by the air-conditioner 701-3.

The determination unit 113 determines the number of sound sources having uttered voice sounds, based on the separation signals (Step S402). For example, as illustrated in FIG. 7, the determination unit 113 calculates the likelihood of voice for each of the separation signal 704-1, the separation signal 704-2, and the separation signal 704-3.

For example, if the separation signals 704-1, 704-2, and 704-3 have likelihoods of voice of 0.9, 0.2, and 0, respectively, and a predetermined threshold of the likelihood of voice is 0.5, then the determination unit 113 determines that the number of sound sources having uttered voice sounds is one because the number of separation signals having a likelihood of voice equal to or more than the threshold is one.

As described above, when there is a noise, the determination unit 113 can correctly determine the number of sound sources. Hence, even when there is a noise, a wraparound speech can be suppressed, and a voice from each speaker can be recognized. Since the function of the determination unit 113 is common, the number of sound sources can also be determined in consideration of a noise in the first embodiment.

The number of sound sources may be determined using the powers of signals, but when the power of a noise is high, for example, there is a possibility that the number of sound sources is incorrectly determined. In this case, it is preferable that the number of sound sources is determined not using the power, but using the likelihood of voice.

The output controller 114-2 produces an output signal according to a determination result (Step S403-2). In the example illustrated in FIG. 7, the number of sound sources is determined to be one, and accordingly, the output controller 114-2 produces and outputs an output signal 705-1 emphasizing the speech 702-1 made by the speaker 401-1, by beam-forming using the input signals 703-1, 703-2, and 703-3. Since the speaker 401-2 and the speaker 401-3 make no speech, the output controller 114-2 makes output signals for these speakers mute.

The recognition unit 115 performs voice recognition for the output signal 705-1 (Step S404).

As described above, according to the second embodiment, an output signal emphasizing a voice from the direction of a sound source can be produced and output. This enables a further increase in the accuracy of subsequent processing such as voice recognition.

Third Embodiment

In a third embodiment, an example of a voice processing system implemented by distributing the functions of a voice processing device to a plurality of devices is described. Hereinafter, an example in which the voice processing system is configured by distributing the functions of the voice processing device 100 according to the first embodiment is described, but, the system may be configured by distributing the functions of the voice processing device 100-2 according to the second embodiment.

Figure 8:
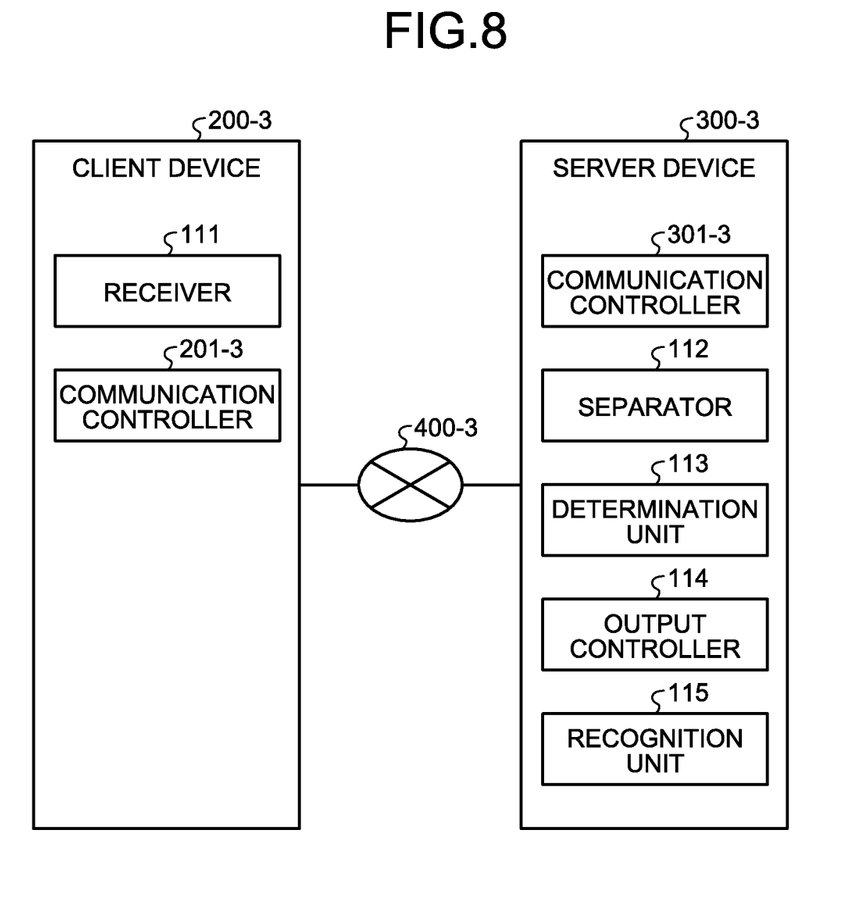
FIG. 8 is a block diagram illustrating a configuration of a voice processing system according to a third embodiment.

FIG. 8 is a block diagram illustrating a configuration example of the voice processing system according to the third embodiment. As illustrated in FIG. 8, the voice processing system is configured such that a server device 300-3 and a client device 200-3 are connected through a network 400-3. As the network 400-3, any network form, such as the Internet, may be employed.

The client device 200-3 may be configured with, for example, a single device such as a typical personal computer. The number of the client devices 200-3 may not be limited to one, and a plurality of the client devices 200-3 may be provided.

The server device 300-3 is a device configured to perform voice processing in response to a demand from the client device 200-3. The server device 300-3 may be configured with physically one device, or alternatively may be implemented as a virtual device in a cloud computing environment. A plurality of the server devices 300-3 may be provided.

The client device 200-3 and the server device 300-3 may have the same hardware configuration as that of the voice processing device 100 illustrated in FIG. 1. In the case where the server device 300-3 does not need to acquire any voice, the client device 200-3 and the server device 300-3 may have a hardware configuration obtained by removing the microphones 54 from the configuration illustrated in FIG. 1.

The client device 200-3 includes the receiver 111 and a communication controller 201-3. The server device 300-3 includes a communication controller 301-3, the separator 112, the determination unit 113, the output controller 114, and the recognition unit 115.

The functions of the receiver 111, the separator 112, the determination unit 113, the output controller 114, and the recognition unit 115 are the same as those in the first embodiment, and these units are assigned with the same reference numerals as those in the first embodiment, and descriptions thereof are omitted.

The communication controller 201-3 controls communications with an external device, such as the server device 300-3. For example, to the server device 300-3, the communication controller 201-3 sends an input signal from the microphone 54 that is received by the receiver 111, on a real-time basis or in response to an instruction given by a user.

In the case where the voice processing system according to the present embodiment is applied to a conferencing system, the client device 200-3 may further include a function unit for controlling a conference. In this case, the communication controller 201-3 may furthermore send/receive information on the conference to/from the server device 300-3.

The communication controller 301-3 controls communications with an external device, such as the client device 200-3. For example, the communication controller 301-3 receives an input signal sent from the client device 200-3. The received input signal is passed to the separator 112. From this point onward, using the same procedure as that in the first embodiment, the functions of the separator 112, the determination unit 113, the output controller 114, and the recognition unit 115 are executed.

The result of voice recognition may be sent to the client device 200-3 by the communication controller 301-3, for example. In the case where the voice processing system according to the present embodiment is applied to a conferencing system, the server device 300-3 may further include a function unit for controlling a conference. In this case, the communication controller 301-3 may furthermore send/receive information on the conference to/from the client device 200-3.

Using FIG. 8, the example in which the server device 300-3 has the functions of the separator 112, the determination unit 113, the output controller 114, and the recognition unit 115 has been described. The way of distributing the functions is not limited to this. For example, the client device 200-3 may be configured to have some of these four function units. Alternatively, the voice processing system may include a plurality of server devices among which these four function units are distributed.

As described above, according to the first to third embodiments, a wraparound speech can be suppressed, and signal distortion can be avoided. As a result, the accuracy of subsequent processing such as voice recognition can be increased.

Computer programs executed by the devices (the voice processing device, the client device, and the server device) according to the above-mentioned embodiments are embedded beforehand in, for example, the ROM 52, and provided.

Computer programs executed by the devices according to the embodiments may be configured to be stored, in an installable file format or an executable file format, in a computer-readable storage medium, such as a compact disc read only memory (CD-ROM), a flexible disk (FD), a compact disc recordable (CD-R), or a digital versatile disc (DVD), and provided as a computer program product.

Furthermore, computer programs executed by the devices according to the embodiments may be configured to be stored on a computer connected to a network such as the Internet, and downloaded via the network to be provided. Alternatively, computer programs executed by the devices according to the embodiments may be configured to be provided or distributed via a network such as the Internet.

Computer programs executed by the devices according to the embodiments enable a computer to function as units of the above-mentioned devices. This computer allows the CPU 51 to read the computer programs from a computer-readable main storage medium and execute the computer programs.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A voice processing device, comprising:
   a receiver configured to receive n input signals that is input into n voice input devices corresponding respectively to n sound sources, n being an integer of 2 or more;
   a separator configured to separate the input signals based at least in part on the sound sources to produce n separation signals; and
   an output controller configured to, according to a number of the sound sources that produce uttered voice sounds, switch between a first output signal produced based at least in part on the input signal and a second output signal produced based at least in part on the separation signal, wherein the output controller outputs the output signal.

2. The device according to claim 1, wherein, when the number of the sound sources that produce the uttered voice sounds is one, the output controller outputs the first output signal produced based at least in part on the input signal, and, when the number of the sound sources that produce the uttered voice sounds is two or more, the output controller outputs the second output signal produced based at least in part on the separation signal.

3. The device according to claim 2, wherein, when the number of the sound sources that produce the uttered voice sounds is one, the output controller produces the output signal emphasizing voice from a sound source direction, by beam-forming based at least in part on the input signal.

4. The device according to claim 2, wherein, when the number of the sound sources that produce the uttered voice sounds is one, the output controller selects one input signal from the n input signals, as the output signal.

5. The device according to claim 1, further comprising a recognition unit configured to perform voice recognition for the output signal.

6. The device according to claim 1, further comprising a determination unit configured to calculate a likelihood that the separation signal is a voice signal, and determine the number of the separation signals comprising the likelihood equal to or more than a threshold as being the number of the sound sources that produce the uttered voice sounds.

7. The device according to claim 1, further comprising a determination unit configured to determine the number of the separation signals comprising a power equal to or more than a threshold as being the number of the sound sources that produce the uttered voice sounds.

8. The device according to claim 7, wherein the threshold is an average of powers of the separation signals.

9. A voice processing method, comprising:
   receiving n input signals acquired by n voice input devices respectively corresponding respectively to n sound sources, n being an integer of 2 or more;
   separating the input signals based at least in part on the sound sources to produce n separation signals;
   according to a number of the sound sources that produces uttered voice sounds, switching between a first output signal produced based at least in part on the input signal and a second output signal produced based at least in part on the separation signal; and
   outputting the output signal.

10. A computer program product comprising a non-transitory computer readable medium including programmed instructions, the instructions, when executed by a computer, causing the computer to function as:
    a receiver configured to receive n input signals acquired by n voice input devices corresponding respectively to n sound sources, n being an integer of 2 or more;
    a separator configured to separate the input signals based at least in part on the sound sources to produce n separation signals; and
    an output controller configured to, according to a number of the sound sources that produce uttered voice sounds, switch between a first output signal produced based at least in part on the input signal and a second output signal produced based on the separation signal, wherein the output controller outputs the output signal.

* * * * *